(12) United States Patent
Martin et al.

(10) Patent No.: US 8,169,886 B2
(45) Date of Patent: May 1, 2012

(54) CODE DIVISION MULTIPLE ACCESS BASED CONTINGENCY TRANSMISSION

(75) Inventors: G. Patrick Martin, Merritt Island, FL (US); William C. Adams, Jr., West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 238 days.

(21) Appl. No.: 12/274,055

(22) Filed: Nov. 19, 2008

(65) Prior Publication Data

US 2010/0124164 A1    May 20, 2010

(51) Int. Cl.
*H04B 15/00* (2006.01)
*G01S 7/40* (2006.01)

(52) U.S. Cl. .......... 370/203; 455/63.4; 342/174

(58) Field of Classification Search .......... 370/203, 370/208, 310, 320, 328, 335, 261, 291, 220; 455/63.1, 63.4, 67.11, 78, 132, 137, 272, 455/423, 424, 427; 342/174, 350, 368, 372, 342/376–378, 413, 417, 442, 445, 451, 463, 342/464

See application file for complete search history.

(56) References Cited

U.S. PATENT DOCUMENTS

| | | | |
|---|---|---|---|
| 6,515,618 B1 * | 2/2003 | Lupash | 342/357.29 |
| 6,594,469 B1 * | 7/2003 | Serri et al. | 455/12.1 |
| 6,744,893 B1 * | 6/2004 | Fleming-Dahl | 380/263 |
| 7,499,499 B2 * | 3/2009 | Gollamudi | 375/295 |
| 2004/0071078 A1 * | 4/2004 | Sudo | 370/208 |
| 2006/0135097 A1 * | 6/2006 | Wang et al. | 455/132 |
| 2007/0077896 A1 * | 4/2007 | Ho et al. | 455/78 |
| 2007/0109190 A1 * | 5/2007 | Smith | 342/359 |
| 2007/0135051 A1 * | 6/2007 | Zheng et al. | 455/63.1 |
| 2008/0045157 A1 * | 2/2008 | Takahashi | 455/67.11 |
| 2010/0093282 A1 * | 4/2010 | Martikkala et al. | 455/63.4 |
| 2010/0120415 A1 * | 5/2010 | Urquhart et al. | 455/424 |

FOREIGN PATENT DOCUMENTS

| | | |
|---|---|---|
| EP | 1265376 | 12/2002 |
| EP | 1865642 | 12/2007 |
| WO | WO 0117156 | 3/2001 |
| WO | WO 2006029042 | 3/2006 |

OTHER PUBLICATIONS

Erin Maneri, LQG controller design using GUI: Application to antennas and radio-telescopes, 2000, Elsevier Science Ltd., pp. 243-264.*

(Continued)

*Primary Examiner* — Chi Pham
*Assistant Examiner* — Prince A Mensah
(74) *Attorney, Agent, or Firm* — Fox Rothschild, LLP; Robert J. Sacco

(57) ABSTRACT

Systems (100) and methods (500) for method for providing a redundant or distinct transmission feature to a communication system (100). The methods involve (508) detecting if there is a communication system fault. If a communication system fault is detected (508:YES), then (512) a plurality of modified transmit signals are generated by combining a transmit signal with a plurality of complex weights ($W_1$, $W_2$, $W_3$). The modified transmit signals are then (514) transmitted from a plurality of antenna elements (106a, 106b, 106c) of the communication system to an object of interest (108). If a communication systems fault is detected (508:NO), then (526) a plurality of redundant or distinct transmit signals are generated by combining the transmit signal with a plurality of first orthogonal or approximately orthogonal numerical sequences. The redundant or distinct transmit signals can then be (528) synchronously transmitted from the antenna elements.

18 Claims, 6 Drawing Sheets

OTHER PUBLICATIONS

Thomson, J.S., et al., "Downlink transmit diversity schemes for CDMA networks" Vehicular Technology Conference, 1999. VTC 1999-Fall. IEEE VTS 50$^{th}$ Amsterdam, Netherlands, Sep. 19-22, 1999, Piscataway, NJ, USA, IEEE, US LINKD.

* cited by examiner

US 8,169,886 B2

CODE DIVISION MULTIPLE ACCESS BASED CONTINGENCY TRANSMISSION

BACKGROUND OF THE INVENTION

1. Statement of the Technical Field

The invention concerns communication systems. More particularly, the invention concerns communication systems and methods for providing a redundant or distinct Code Division Multiple Access (CDMA) transmission feature to the communication systems.

2. Description of the Related Art

Multiple element antenna arrays are widely used in wireless communications systems to enhance the transmission and reception of signals. In particular, the enhanced performance is generally provided by using such antenna arrays in conjunction with beamforming techniques. In conventional beamforming, the naturally occurring interference between the different antenna elements in the antenna array is typically used to change the overall directionality for the array. For example, during transmission, the phase and relative amplitude of the transmitted signal at each antenna element is adjusted, in order to create a desired pattern of constructive and destructive interferences at the wavefront of the transmitted signal. During signal reception, the different antenna elements are modified in phase and amplitude in such a way that a pre-defined pattern of radiation is preferentially observed by the antenna elements.

In general, such antenna arrays typically include a system controller, a plurality of antenna controllers, and a plurality of antenna elements (e.g., dish antennas). Each of the antenna elements is communicatively coupled to the system controller and a respective one of the antenna controllers via cables. During transmission and reception, each antenna element converts electrical signals into electromagnetic waves, and vice versa. The system controller, using conventional beamforming techniques, varies the configuration of the various components in the antenna array to provide a particular radiation pattern during transmission or reception. However, as the dimensions of the array, the number of antenna elements, and the precision required in certain beamforming application increase, properly concerting the actions of the various components becomes more difficult.

SUMMARY OF THE INVENTION

Embodiments of the present invention concern methods for providing a redundant or distinct transmission feature to a communication system. The method embodiments involve detecting at the communication system if there is a communication systems fault. The communication systems fault can be a result of an operational failure occurring at the communication system, such as an operational failure associated with a navigation system. An operational failure associated with a navigation system can result in the degradation or loss of the array antenna attitude information that is required to accurately point the beam of an array antenna. The communication systems fault can also be a result of an operational failure occurring at an object of interest.

If a communication systems fault is not detected, then modified transmit signals are generated by combining a transmit signal with complex weights. The modified transmit signals are then communicated from antenna elements of the communication system to the object of interest. At the object of interest, the modified transmit signals are processed to recover information contained therein.

If a communication systems fault is detected, then redundant or distinct transmit signals are generated by combining the transmit signal with first orthogonal or approximately orthogonal numerical sequences. The first orthogonal numerical sequences can be generated using orthogonal Walsh functions. The first approximately orthogonal numerical sequences can be generated using at least one random number sequence generator, pseudo-random number sequence generator, and/or chaotic sequence generator. It should be noted that pseudo-random number sequences are not perfectly orthogonal. Also, the selected random number sequences and chaotic sequences may not be perfectly orthogonal. In general, perfect orthogonality among the selected sequences is not required for the present invention to work effectively. The redundant or distinct transmit signals are then synchronously transmitted from the antenna elements. The redundant or distinct transmit signals can be received at the object of interest. At the object of interest, the redundant or distinct transmit signals can be processed to recover information contained therein. More particularly, the redundant or distinct transmit signals can be processed to despread the same using second orthogonal or approximately orthogonal numerical sequences. The second orthogonal or approximately orthogonal numerical sequences are the same as the first orthogonal or approximately orthogonal numerical sequences, respectively.

According to an aspect of the present invention, the communication system has two or more modes for using contingency CDMA. Such modes can include, but are not limited to, a redundant data mode and a distinct data mode. In the redundant data mode, redundant transmit signals are employed. In such a scenario, the same information (or data) is impressed on each transmit signal. Accordingly, each antenna element at the transmitter radiates the same data in the direction of the object of interest. At the object of interest, a pre-detection operation is performed for adaptively combining the weak, relatively high data rate received signals to recover the desired transmit data. The adaptive combination of the received signals can be accomplished using an adaptive algorithm (e.g., a Blind Source Separation (BSS) algorithm) to calculate required weighting vectors. Adaptive algorithms are well known to those having ordinary skill in the art, and therefore will not be described herein. However, it should be understood that any BSS algorithm or other adaptive algorithm can be used without limitation. In the distinct data mode, distinct transmit signals are employed. In such a scenario, different information (or data) is impressed on each transmit signal. The transmit signals are communicated to the object of interest. At the object of interest, a demodulation operation and a multiplexing operation are performed. The demodulation operation is performed for demodulating the relatively strong, relatively low data rate distinct data signals. The multiplexing operation is performed for reconstructing the transmitted information (or data). In both modes as described above, orthogonal or approximately orthogonal sequences are used to spread and despread the data signals, regardless of whether the data (information) conveyed on each CDMA channel is redundant or distinct.

Embodiments of the present invention also concern communication systems. The communication systems include a detection device, beamformers, combiners, and antenna elements. The detection device is configured for detecting if there is a communication system fault. The beamformers are configured for generating the modified transmit signals. The combiners are configured for generating the redundant or distinct transmit signals. The antenna elements are configured for transmitting the modified transmit signals to the object of interest and synchronously transmitting the redundant or distinct transmit signals therefrom.

The communication systems can also include at least one orthogonal sequence generator for generating the first orthogonal numerical sequences using orthogonal Walsh functions. The communication systems can further include one or more approximately orthogonal sequence generators for generating the first approximately orthogonal numerical sequences. The approximately orthogonal sequence generators can include, but are not limited to, random number sequence generators and pseudo-random number sequence generators.

The object of interest is configured for receiving the modified transmit signals. Thereafter, the modified transmit signals are processed at the object of interest to recover information contained therein. The object of interest is also configured for receiving the redundant or distinct transmit signals and processing the redundant or distinct transmit signals to recover information contained therein. More particularly, the object of interest is configured for generating the second orthogonal or approximately orthogonal numerical sequences and using the second orthogonal or approximately orthogonal numerical sequences to despread the redundant or distinct transmit signals.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
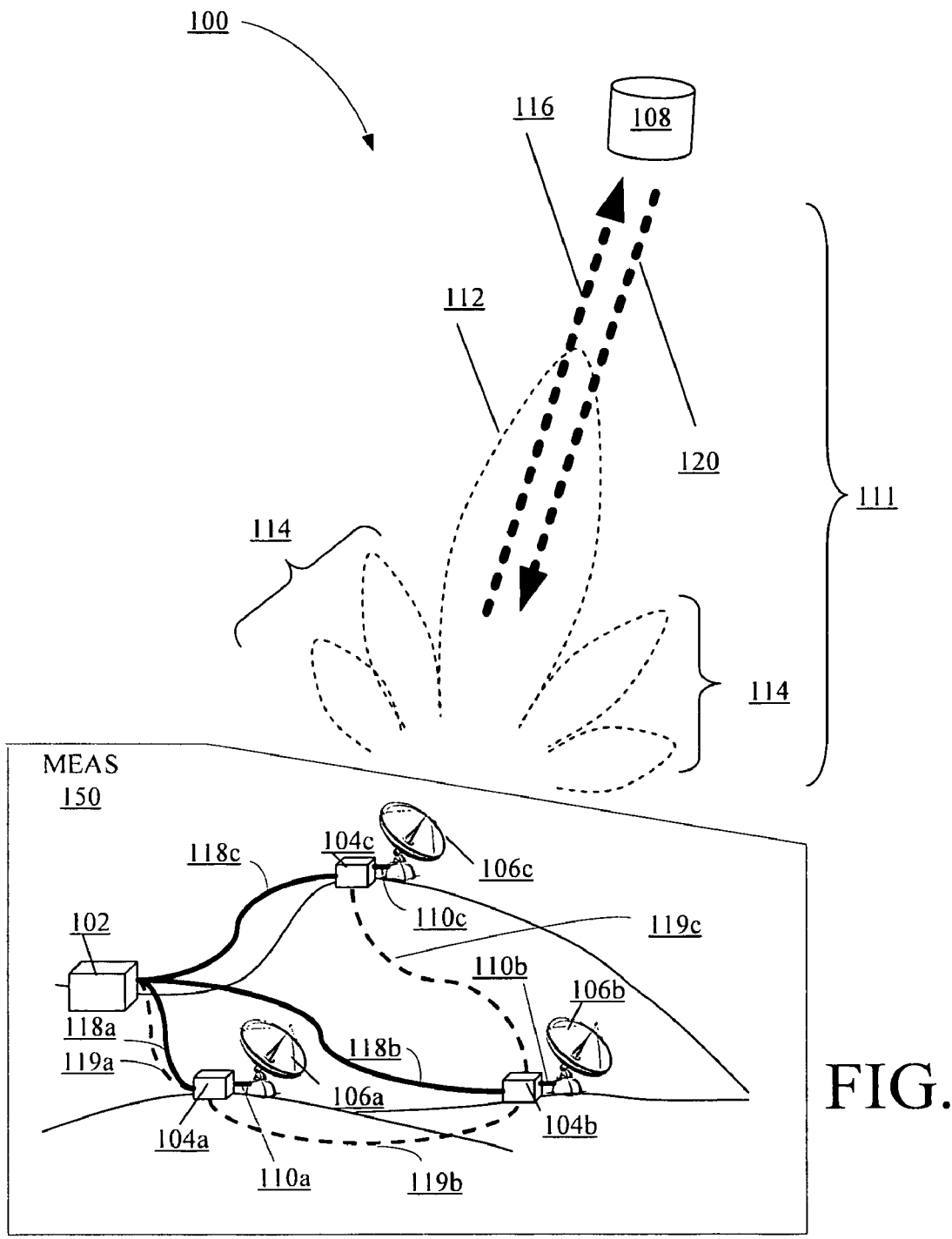
FIG. 1 is a schematic illustration of an exemplary communications system that is useful for understanding the present invention.

The present invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention will now be described with respect to FIGS. 1-6. Embodiments of the present invention relate to communication systems and methods for providing a redundant or distinct CDMA transmission feature to the communication systems. The methods generally involve detecting if there is a communication systems fault. If a communication systems fault is not detected, then modified transmit signals are generated by combining a transmit signal with complex weights. The modified transmit signals are then communicated from antenna elements of the communication system to an object of interest. At the object of interest, the modified transmit signals are processed to recover information contained therein. If a communication systems fault is detected, then redundant or distinct transmit signals are generated by combining the transmit signal with orthogonal or approximately orthogonal numerical sequences. The redundant or distinct transmit signals can then be synchronously transmitted from the antenna elements. The redundant or distinct transmit signals can be received at the object of interest. At the object of interest, the redundant or distinct transmit signals can be processed to despread the same using replicas of the orthogonal or approximately orthogonal numerical sequences.

It should be emphasized that the transmit signals can be perfectly orthogonal. This perfect orthogonality provides performance benefits to communication systems. For example, all transmission of perfectly orthogonal signals are synchronous. In contrast, transmission of signals in conventional CDMA based communication systems is not synchronous.

Before describing the systems and methods of the present invention, it will be helpful in understanding an exemplary environment in which the invention can be utilized. In this regard, it should be understood that the systems and methods of the present invention can be utilized in a variety of different applications where a redundant or distinct CDMA transmission feature is needed. Such applications include, but are not limited to, mobile/cellular telephone applications, military communication applications, and space communication applications.

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Referring now to FIG. 1, there is provided a schematic illustration of a communication system 100 that is useful for understanding the present invention. As shown in FIG. 1, the communication system 100 comprises a multi-element antenna system (MEAS) 150 for transmitting signals to and receiving signals from at least one object of interest 108 remotely located from the MEAS 150. In FIG. 1, the object of interest 108 is shown as an airborne or spaceborne object, such as a spacecraft, a natural or artificial satellite, or a celestial object (e.g., a planet, a moon, an asteroid, a comet, etc . . . ). However, the present invention is not limited in this regard and the MEAS 150 can also be used for transmitting and receiving signals from objects of interest 108 that are not airborne or spaceborne but are still remotely located with respect to the MEAS 150. For example, a ground-based MEAS 150 can be used to provide communications with objects of interest 108 at other ground-based or sea-based locations. The MEAS 150 can generally include an array control system (ACS) 102 for controlling the operation of multiple antenna elements 106a, 106b, 106c.

In FIG. 1, the ACS 102 is shown as controlling the operation of antenna elements 106a, 106b, 106c and associated RF equipment 104a, 104b, 104c. The antenna elements 106a, 106b, 106c provide wireless communications. For example, if the MEAS 150 is in a transmit mode, then each antenna element 106a, 106b, 106c converts electrical signals into electromagnetic waves. The radiation pattern 111 resulting from the interference of the electromagnetic waves transmitted by the different antenna elements 106a, 106b, 106c can then be adjusted to a central beam 112 in the radiation pattern 111 aimed in a direction 116 of the object of interest 108. The radiation pattern 111 of the antenna elements 106a, 106b, 106c also generates smaller side beams (or side lobes) 114 pointing in other directions with respect to the direction of the central beam 112. However, because of the relative difference in magnitude between the side beams 114, the radiation pattern preferentially transmits the signal in the direction of the central beam 112. Therefore, by varying the phases and the amplitudes of the signals transmitted by each antenna element 106a, 106b, 106c, the magnitude and direction of the central beam 112 can be adjusted. If the MEAS 150 is in a receive mode, then each of the antenna elements 106a, 106b, 106c captures energy from passing waves propagated over transmission media (not shown) in the direction 120 and converts the captured energy to electrical signals. In the receive mode, the MEAS 150 can be configured to combine the electrical signals according to the radiation pattern 111 to improve reception from direction 120, as described below.

In FIG. 1, the antenna elements 106a, 106b, 106c are shown as reflector-type (e.g., dish-type) antenna elements, which generally allow adjustment of azimuth (or rotation) and elevation (angle with respect to a ground plane). Therefore, in addition to adjustment of phase and amplitude of the signal transmitted by each of the antenna elements 106a, 106b, 106c, the azimuth and elevation of each antenna element 106a, 106b, 106c can also be used to further steer the central beam 112 and adjust the radiation pattern 111. However, embodiments of the present invention are not limited in this regard. The antenna elements 106a, 106b, 106c can comprise directional or omni-directional antenna elements.

Although three (3) antenna elements 106a, 106b, 106c are shown in FIG. 1, the various embodiments of the present invention are not limited in this regard. Any number of antenna elements 106a, 106b, 106c can be used without limitation. Furthermore, the spacing between the antenna elements 106a, 106b, 106c with respect to each other is not limited. Accordingly, the antenna elements 106a, 106b, 106c can be widely or closely spaced. However, as the spacing between the antenna elements 106a, 106b, 106c increases, the central beam 112 generally becomes narrower and the side beams (or side lobes) 114 generally become larger. The antenna elements 106a, 106b, 106c can also be regularly spaced (not shown) with respect to one another to form a two dimensional (2D) array of antenna elements or arbitrarily spaced (or non-linearly spaced) with respect to one another (as shown in FIG. 1) to form a three dimensional (3D) array of antenna elements. As shown in FIG. 1, the arbitrary spacing of the antenna elements 106a, 106b, 106c can include locations having different altitudes and locations having different distances between each other.

As shown in FIG. 1, each of the antenna elements 106a, 106b, 106c is communicatively coupled to respective RF equipment 104a, 104b, 104c via a respective cable assembly 110a, 110b, 110c (collectively 110). Each of the cable assemblies 110a, 110b, 110c can have the same or different lengths. As used herein, the term "cable assembly" refers to any number of cables provided for interconnecting two different components. In various embodiments of the present invention, the cables in the cables assembly 110 can be bundled or unbundled.

The RF equipment 104a, 104b, 104c control the antenna elements 106a, 106b, 106c, respectively. For example, for the directional antenna elements 106a, 106b, 106c shown in FIG. 1, the RF equipment 104a, 104b, 104c are configured to control antenna motors (not shown), antenna servo motors (not shown), and antenna rotators (not shown). The RF equipment devices 104a, 104b, 104c can also include hardware entities for processing transmit signals and receive signals. The RF equipment 104a, 104b, 104c will be described in more detail below in relation to FIGS. 3-4.

As shown in FIG. 1, each of the RF equipment 104a, 104b, 104c is communicatively coupled to the ACS 102 via a respective communications link 118a, 118b, 118c. Generally, such communications links are provided via a cable assembly. However, embodiments of the present invention are not limited in this regard. In the various embodiments of the present invention, the communications links 118a, 118b, 118c can comprise wireline, optical, or wireless communication links. The cable assemblies for the communications links 118a, 118b, 118c can have the same or different lengths. Although the communications links 118a, 118b, 118c are shown to couple the RF equipment 104a, 104b, 104c to the ACS 102 in a parallel arrangement, embodiments of the present invention are not limited in this regard. The RF equipment 104a, 104b, 104c can also be coupled to the ACS 102 in a series arrangement, such as that shown by communication links 119a, 119b, 119c.

In operation, the ACS 102 modulates signals to be transmitted by the antenna elements 106a, 106b, 106c. The ACS 102 also demodulates signals received from other antenna systems. The ACS 102 further controls beam steering. The ACS 102 will be described in more detail below in relation to FIGS. 2-4.

Figure 2:
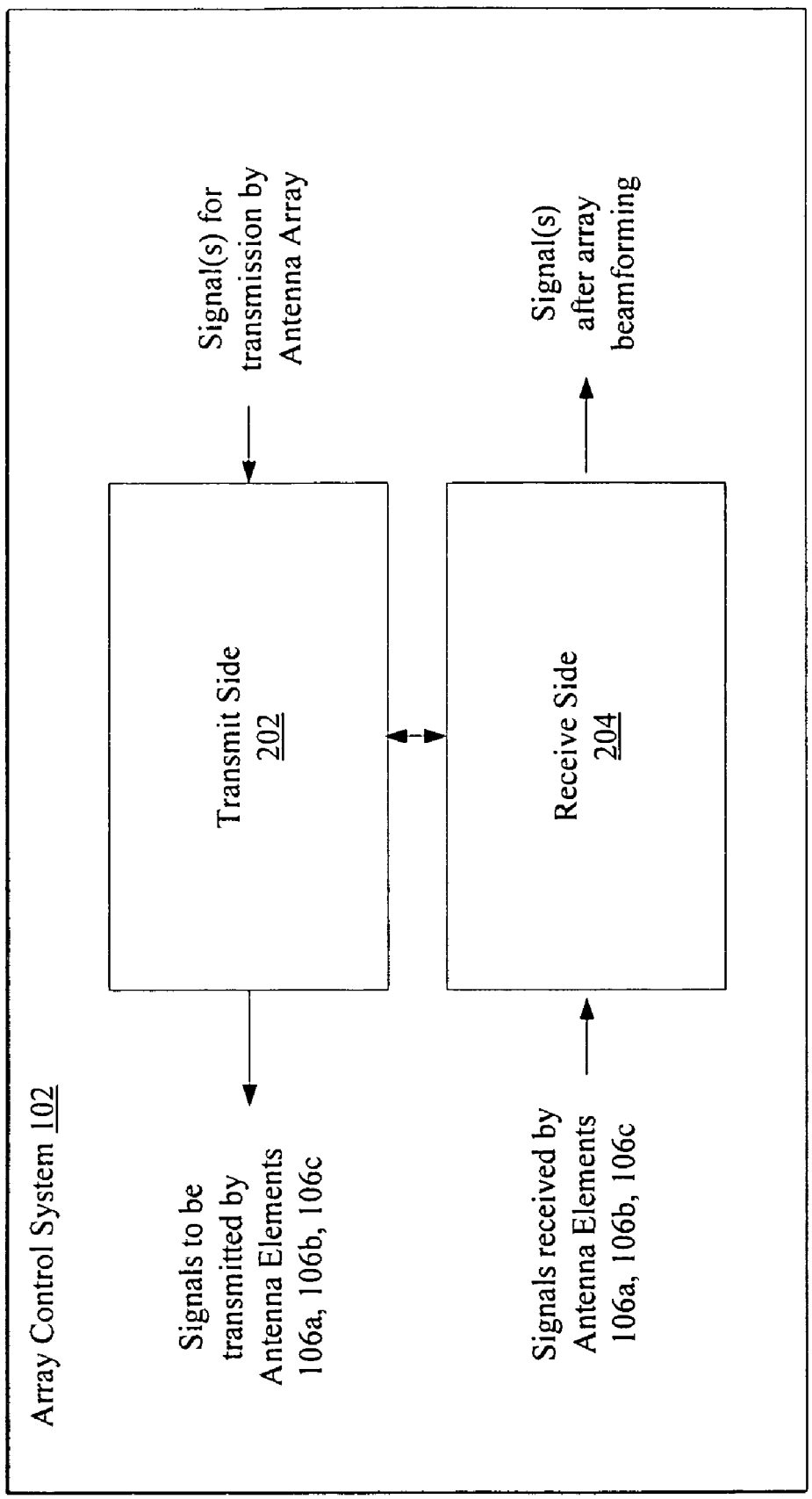
FIG. 2 is a block diagram of the Array Control System (ACS) shown in FIG. 1.

Referring now to FIG. 2, there is provided a more detailed block diagram of the ACS 102 shown in FIG. 1. As shown in FIG. 2, the ACS 102 includes a transmit side 202 and a receive side 204. Furthermore, the ACS 102 can be configured to manage both transmission and reception operations of the MEAS 150 based on signals for transmission and control signals. In particular, the transmit side 202 can generate signals to be transmitted by the antenna elements 106a, 106b, 106c. Additionally or alternatively, the transmit side 202 can receive one or more signals from one or more signal generators (not shown). The transmit side 202 can also configured for modulating each of the generated or received signals and communicating the modulated signals to the RF equipment 104a, 104b, 104c for transmission of the same over a transmission media (not shown). The transmit side 202 will be described in more detail below in relation to FIG. 3.

The receive side 204 is configured for capturing energy from passing waves transmitted over the transmission media (not shown) and converting the captured energy to an electrical signal. The receive side 204 can also be configured for demodulating the electrical signal and communicating the demodulated electrical signal to an output device (not shown). The receive side 204 will be described below in more detail in relation to FIG. 4.

Although the transmit side 202 and receive side 204 can operate separately or independently in some embodiments of the present invention, in other embodiments, operation of the transmit side 202 can be further adjusted based on one or more signals generated in the receiver side 204 of the ACS 102, as shown in FIG. 2.

Figure 3:
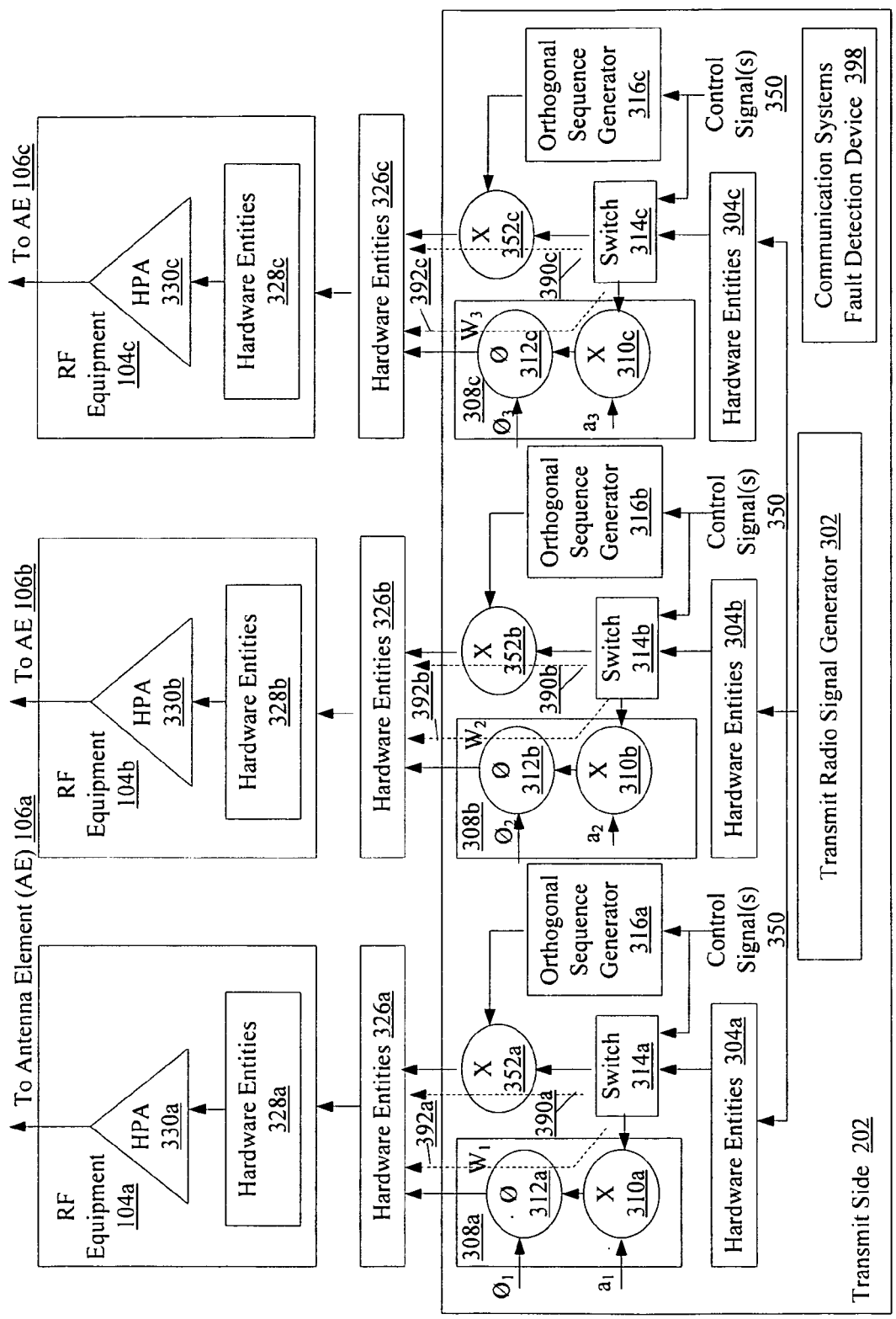
FIG. 3 is a block diagram of the transmit side of the ACS shown in FIG. 2 communicatively coupled to the RF equipment shown in FIG. 1.

Referring now to FIG. 3, there is provided a block diagram of the transmit side 202 of FIG. 2 communicatively coupled to the RF equipment 104a, 104b, 104c of FIG. 1. As shown in FIG. 3, the transmit side 202 is comprised of a Transmit Radio Signal Generator (TRSG) 302, hardware entities 304a, 304b, 304c, switches 314a, 314b, 314c, beamformers 308a, 308b, 308c, Orthogonal Sequence Generators (OSGs) 316a, 316b, 316b, combiners 352a, 352b, 352c, and a Communication Systems Fault Detection Device (CSFDD) 398. The TRSG 302 generates signals to be transmitted from the array of antenna elements 106a, 106b, 106c. The TRSG 302 is communicatively coupled to the hardware entities 304a, 304b, 304c. The phase "hardware entities", as used herein, refers to signal processing devices. The signal processing devices can include, but are not limited to, filters and amplifiers. Each of the hardware entities 304a, 304b, 304c is communicatively coupled to a respective one of the switches 314a, 314b, 314c.

Each of the switches 314a, 314b, 314c is responsive to one or more control signals 350 so as to direct a transmit signal to one of the transmit paths 390a, 390b, 390c, 392a, 392b, 392c. The control signals 350 can be generated within the transmit side 202, elsewhere in the ACS 102, or external to the ACS 102. If the control signal(s) 350 are generated within the transmit side 202, then the control signal(s) 350 can be generated by the CSFDD 398 or a processor (not shown). The control signals 350 can indicate whether the ACS 102 is in a normal operating mode or an emergency operating mode. If the ACS 102 is in it's normal operating mode, then each of the switches 314a, 314b, 314c directs a transmit signal to the respective transmit path 392a, 392b, 392c. If the ACS 102 is in it's emergency operating mode, then each of the switches 314a, 314b, 314c directs a transmit signal to the respective transmit path 390a, 390b, 390c.

The ACS 102 can be placed in its emergency operating mode when a communication systems fault is detected by the CSFDD 398. The communications systems fault can be detected during a performance of an array beamforming self test by the CSFDD 398. If the array beamforming self test indicates a healthy condition, then the ACS 102 continues with normal operations. However, if the self test indicates an unhealthy condition, then the ACS 102 continues with emergency operations. The normal and emergency operations will become more evident as the discussion progresses.

According to an embodiment of the present invention, the communication systems fault is a result of an operational failure occurring at a transmitting communication system (e.g., the communication system 100 of FIG. 1) and/or an operational failure occurring at a receiving communication system (e.g., the object of interest 108 of FIG. 1). If the communication systems fault is a result of an operational failure occurring at the transmitting communication system, then the operational failure can be associated with an antenna array, a navigation system, and a transmitter (or a transceiver). An operational failure associated with a navigation system can result in the degradation or loss of the array antenna attitude information that is required to accurately point the beam of an array antenna. In contrast, if the communication systems fault is a result of an operational failure occurring at the receiving communication system, then the operational failure can be associated with an antenna array and a receiver (or a transceiver). Embodiments of the present invention are not limited in this regard.

Referring again to FIG. 3, each of the transmit paths 392a, 392b, 392c includes a respective beamformer 308a, 308b, 308c. Each of the beamformers 308a, 308b, 308c can be utilized to control the phase and/or the amplitude of transmit signals. In general, the phase and/or amplitude control of the transmit signals can be used to adjust formation of the central beam 112, the side beams (or side lobes) 114, and nulls in the radiation pattern 111. Nulls correspond to the directions in which destructive interference results in a transmit signal's strength that is significantly reduced with respect to the directions of the central beam 112 and the side beams 114. The combined amplitude $a_1$, $a_2$, $a_3$ and phase shift $\emptyset_1$, $\emptyset_2$, $\emptyset_3$ are referred to herein as a complex weight $W_1$, $W_2$, $W_3$. The values of the complex weights $W_1$, $W_2$, $W_3$ can periodically change in accordance with a particular communication system application. For example, the values of the complex weights $W_1$, $W_2$, $W_3$ can periodically change so as to counteract phase shifts resulting from environmental effects on hardware components of the communication system 100.

Each of the beamformers 308a, 308b, 308c combines a respective complex weight $W_1$, $W_2$, $W_3$ with the transmit signals to be provided to the RF equipment 104a, 104b, 104c, respectively. For example, as shown in FIG. 3, each beamformers 308a, 308b, 308c includes a respective amplitude adjusters 310a, 310b, 310c for adjusting the amplitude of the transmit signals from the respective hardware entities 304a, 304b, 304c based on an amplitude $a_1$, $a_2$, $a_3$. Each beamformers 308a, 308b, 308c can also include phase adjusters 312a, 312b, 312c for adjusting a phase of the transmit signals from respective hardware entities 304a, 304b, 304c based on a phase shift $\emptyset_1$, $\emptyset_2$, $\emptyset_3$. The amplitude $a_1$, $a_2$, $a_3$ and phase shift $\emptyset_1$, $\emptyset_2$, $\emptyset_3$ can be generated based on a model or calibration data describing the behavior of the MEAS 150. Each beamformer 308a, 308b, 308c is communicatively coupled to respective hardware entities 326a, 326b, 326c. The hardware entities 326a, 326b, 326c can reside in the transmit side 202 (not shown), external to the transmit side 202 (shown in FIG. 3), in the RF equipment 104a, 104b, 104c (not shown), or external to the RF equipment 104a, 104b, 104c (shown in FIG. 3). If the hardware entities 326a, 326b, 326c are external to the RF equipment 104a, 104b, 104c, then each of the hardware entities 326a, 326b, 328c is communicatively coupled to the RF equipment 104a, 104b, 104c, respectively.

The RF equipment 104a, 104b, 104c comprises hardware entities 328a, 328b, 328c and high power amplifiers (HPA) 330a, 330b, 330c, respectively. HPAs are well known to those having ordinary skill in the art, and therefore will not be described herein. However, it should be understood that the HPAs 330a, 330b, 330c communicate signals to the antenna elements 106a, 106b, 106c for transmission therefrom in the direction 116 of an object of interest 108.

As also shown in FIG. 3, the transmit paths 390a, 390b, 390c include the combiners 352a, 352b, 352c. Each of the combiners 352a, 352b, 352c can generally be utilized to combine a transmit signal with an orthogonal or approximately orthogonal numerical sequence. As such, the combiners 352a, 352c, 352c can include, but are not limited to, signal multipliers and complex multipliers. The orthogonal or approximately orthogonal numerical sequences can be generated by one or more OSGs 316a, 316b, 316b. The OSGs 316a, 316b, 316b are responsive to the control signal(s) 350. The OSGs 316a, 316b, 316b can include, but are not limited to, Walsh function generators, random number sequence generators, pseudo-random number sequence generators, and chaotic sequence generators. Walsh function generators are configured to generate one or more orthogonal Walsh Functions, which are well known to those having ordinary skill in the art. The random number, pseudo-random number, and chaotic sequence generators are well known to those having ordinary skill in the art, and therefore will not be described herein. However, it should be understood that any known random number sequence generators, pseudo-random number sequence generators, and chaotic sequence generators can be used without limitation. It should be noted that pseudo-random number sequences are not perfectly orthogonal. Also, the random number sequences and chaotic sequences can be selected to be perfectly orthogonal or approximately orthogonal. In general, perfect orthogonality among the numerical sequences is not required for embodiments of the present invention to work effectively.

The orthogonal or approximately orthogonal numerical sequences facilitate the provision of a redundant or distinct CDMA transmission feature to the transmit side 202 of the ACS 102. In this regard, it should be understood that the orthogonal or approximately orthogonal numerical sequences can provide redundant or distinct transmit signals including the same information (or data) that are separable, i.e., each of the transmit signals can be recovered at a receiving device (e.g., the object of interest 108 of FIG. 1) despite being combined with other transmit signals. The redundant or distinct transmit signals can be generated by combining a transmit signal with a plurality of different orthogonal or approximately orthogonal numerical sequences. The redundant or distinct transmit signals can include the same or different amount of information (or data) as would be transmitted during normal operation. For example, each of the redundant or distinct transmit signals can include less information (or data) then the transmit signals generated during normal operations. Also, the redundant or distinct transmit signals can have the same or different data transfer rates.

According to an embodiment of the present invention, the orthogonal or approximately orthogonal numerical sequences can be generated using a plurality of orthogonal Walsh functions, a plurality of different random number sequences, a plurality of pseudo-random number sequences, and/or a plurality of chaotic sequences. Random number sequences, pseudo-random number sequences and chaotic sequences are well known to those having ordinary skill in the art, and therefore will not be described herein. Embodiments of the present invention are not limited in this regard.

Referring again to FIG. 3, each of the combiners 352a, 352b, 352c is communicatively coupled to respective hardware entities 326a, 326b, 326c. Each of the hardware entities 326a, 326b, 328c is communicatively coupled to RF device equipment 104a, 104b, 104c, respectively. The RF equipment 104a, 104b, 104c processes the received signals and communicates the signals to the antenna elements 106a, 106b, 106c for transmission therefrom. In this regard, it should be understood that the RF equipment 104a, 104b, 104c can include, but is not limited to, hardware entities 328a, 328b, 328c and HPAs 330a, 330b, 330c.

According to embodiments of the present invention, the communication system 100 has two or more modes for using the contingency CDMA feature. Such modes can include, but are not limited to, a redundant data mode and a distinct data mode. In the redundant data mode, redundant transmit signals are employed. In such a scenario, the same information (or data) is impressed on each transmit signal. Accordingly, each antenna element 106a, 106b, 106c radiates the same data in the direction 116 of the object of interest 108. At the object of interest 108, a pre-detection operation is performed for adaptively combining the weak, relatively high data rate received signals to recover the desired transmit data. The adaptive combination of the received signals can be accomplished using an adaptive algorithm (e.g., a BSS algorithm) to calculate required weighting vectors. Adaptive algorithms are well known to those having ordinary skill in the art, and therefore will not be described herein. However, it should be understood that any BSS algorithm or other adaptive algorithm can be used without limitation. In the distinct data mode, distinct transmit signals are employed. In such a scenario, different information (or data) is impressed on each transmit signal. The transmit signals are communicated from the antenna elements 106a, 106b, 106c to the object of interest 108. At the object of interest 108, a demodulation operation and a multiplexing operation are performed. The demodulation operation is performed for demodulating the relatively strong, relatively low data rate distinct data signals. The multiplexing operation is performed for reconstructing the transmitted information (or data). In both modes as described above, orthogonal or approximately orthogonal sequences are used to spread and despread the data signals, regardless of whether the data (information) conveyed on each CDMA channel is redundant or distinct. Embodiments of the present invention are not limited in this regard.

Figure 4:
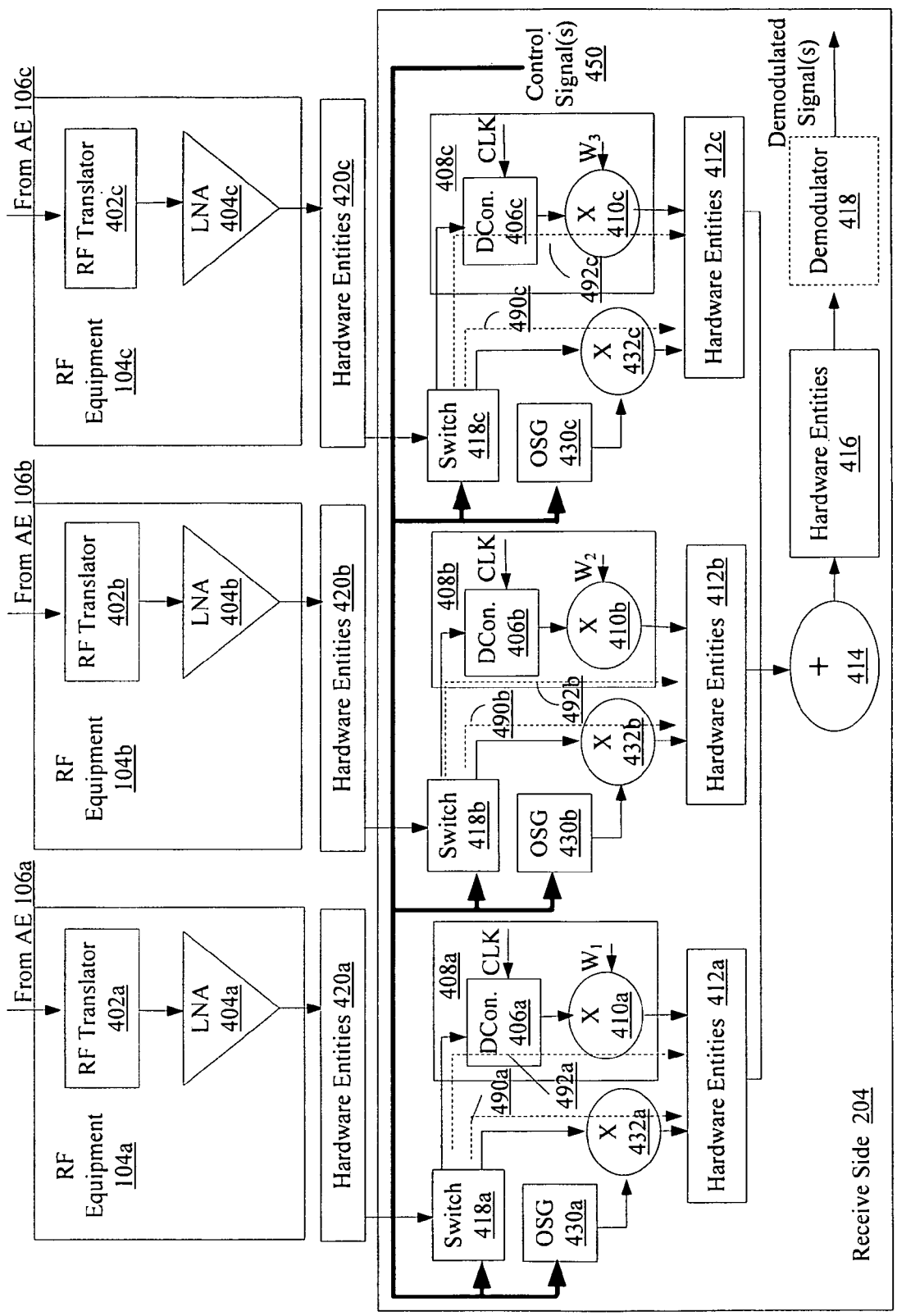
FIG. 4 is a block diagram of the receive side of the ACS shown in FIG. 2 communicatively coupled to the RF equipment shown in FIG. 1.

Referring now to FIG. 4, there is provided a block diagram of the receive side 204 of FIG. 2 communicatively coupled to the RF equipment 104a, 104b, 104c of FIG. 1. As shown in FIG. 4, the RF equipment 104a, 104b, 104c further comprise Radio Frequency (RF) translators 402a, 402b, 402c and Low Noise Amplifiers (LNAs) 404a, 404b, 404c. Each of the RF translators 402a, 402b, 402c performs signal frequency translation of received signals from a respective antenna element 106a, 106b, 106c in the respective RF equipment 104a, 104b, 104c. The translation function of the RF translators 402a, 402b, 402c generally converts the received signal at a respective antenna element 106a, 106b, 106c from an RF to an intermediate frequency (IF). The LNAs 404a, 404b, 404c generally amplify the IF signals output from the RF translators 402a, 402b, 402c, respectively. Each of the LNAs 404a, 404b, 404c is communicatively coupled to the receive side 204 of the ACS 102 via hardware entities 420a, 420b, 420c.

The receive side 204 comprises switches 418a, 418b, 418c, beamformers 408a, 408b, 408c, OSGs 430a, 430b, 430c, combiners 432a, 432b, 432c, hardware entities 412a, 412b, 412c, 416, a signal adder 414, and an optional demodulator 418. Embodiments of the present invention are not limited in this regard. For example, the receive side 204 can be absent of the hardware entities 412a, 412b, 412c, 416.

Each of the switches 418a, 418b, 418c is communicatively coupled to respective RF equipment 104a, 104b, 104c via hardware entities 420a, 420b, 420c. Each of the switches 418a, 418b, 418c is responsive to one or more control signals 450 so as to direct a receive signal to one of the receive paths 490a, 490b, 490c, 492a, 492b, 492c. The control signals 450 can be generated within the receive side 204, elsewhere in the ACS 102, or external to the ACS 102. The control signals 450 can indicate whether the ACS 102 is in a normal operating mode or an emergency operating mode. If the ACS 102 is in its normal operating mode, then each of the switches 418a, 418b, 418c directs a receive signal to the respective receive path 492a, 492b, 492c. If the ACS 102 is in its emergency operating mode, then each of the switches 418a, 418b, 418c directs a receive signal to the respective receive path 490a, 490b, 490c.

As shown in FIG. 4, each of the receive paths 492a, 492b, 492c includes a respective beamformer 408a, 408b, 408c. Each of the beamformers 408a, 408b, 408c can generally include a down converter 406a, 406b, 406c and a combiner

410a, 410b, 410c. Embodiments of the present invention are not limited in this regard. For example, the beamformers 408a, 408b, 408c can be absent of the down converters 406a, 406b, 406c.

Each down converter 406a, 406b, 406c converts a digitized real signal centered at an IF to a baseband complex signal centered at zero (0) frequency. The down converters 406a, 406b, 406c share a common clock (not shown), and therefore receive the same clock (CLK) signal. The CLK signal can be generated within the receive side 204, elsewhere in the ACS 102, or external to the ACS 102. The down converters 406a, 406b, 406c can be set to the same center frequency and bandwidth. The down converters 406a, 406b, 406c can also comprise local oscillators that are in-phase with each other. This in-phase feature of the down converters 406a, 406b, 406c ensures that the down converters 406a, 406b, 406c shift the phases of signals by the same amount. After converting the digitized real signals to baseband complex signals, the down converters 406a, 406b, 406c communicate the baseband complex signals to the combiners 410a, 410b, 410c, respectively.

Each of the combiners 410a, 410b, 410c combines a baseband complex signal with a complex weight $W_1, W_2, W_3$ for a particular antenna element 106a, 106b, 106c. The combiners 410a, 410b, 410c can include, but are not limited to, complex multipliers. The complex weights $W_1, W_2, W_3$ are selected to combine the receive signals according to a particular radiation pattern. After combining a baseband complex signal with a complex weight $W_1, W_2, W_3$, the combiners 410a, 410b, 410c communicate the signals to the hardware entities 412a, 412b, 412c, respectively. The hardware entities 412a, 412b, 412c can further process the signals received from the beamformers 408a, 408b, 408c. The hardware entities 412a, 412b, 412c communicate the processed signals to the signal adder 414.

As further shown in FIG. 4, each of the receive paths 390a, 390b, 390c includes a respective combiner 432a, 432b, 432c. Each of the combiners 432a, 432b, 432c combines a baseband complex signal with an orthogonal or approximately orthogonal numerical sequence for a particular antenna element 106a, 106b, 106c. The orthogonal or approximately orthogonal numerical sequences can be generated by one or more OSGs 430a, 430b, 430c (as shown in FIG. 4), which are also responsive to one or more control signals 450. The OSGs 430a, 430b, 430c can include, but are not limited to, Walsh function generators, random number sequence generators, pseudo-random number sequence generators, and chaotic sequence generators. Embodiments of the present invention are not limited in this regard. For example, the orthogonal or approximately orthogonal numerical sequence can be generated within the receive side 204 (as shown in FIG. 4), elsewhere in the ACS 102, or external to the ACS 102.

Notably, the orthogonal or approximately orthogonal numerical sequences are the same as the orthogonal or approximately orthogonal numerical sequence employed by a transmitting communication system from which signals are received. In effect, the orthogonal or approximately orthogonal numerical sequences facilitate the provision of a redundant or distinct CDMA transmission feature to a communication system. In this regard, it should be understood that the orthogonal or approximately orthogonal numerical sequence can be used to despread redundant or distinct transmit signals received from a transmitting communication system. Thereafter, the combiners 432a, 432b, 432c communicate the despread signals to the hardware entities 412a, 412b, 412c, respectively. The hardware entities 412a, 412b, 412c can further process the despread signals received from the combiners 432a, 432b, 432c. The hardware entities 412a, 412b, 412c communicate the processed signals to the signal adder 414.

At the signal adder 414, the processed signals are combined to form a combined signal. Subsequent to forming the combined signal, the signal adder 414 communicates the same to the hardware entities 416 for further processing. After processing the combined signal, the hardware entities 416 can communicate the same to the optional demodulator 418 for demodulation.

It should be appreciated that the object of interest 108 (shown in FIG. 1) can include a receive circuit that is the same as or substantially similar to the receive side 204 circuit shown in FIG. 4. In effect, the object of interest 108 can generally be capable of (a) capturing energy from passing waves propagated over transmission media (not shown) by a transmitting communication system operating in a normal mode (e.g., the MEAS 150 of FIG. 1), (b) converting the captured energy to electrical signals, and (c) combining the electrical signals according to a radiation pattern. The object of interest 108 can also generally be capable of dispreading signals received from a transmitting communication system operating in an emergency mode (e.g., the MEAS 150 of FIG. 1).

Figure 5:
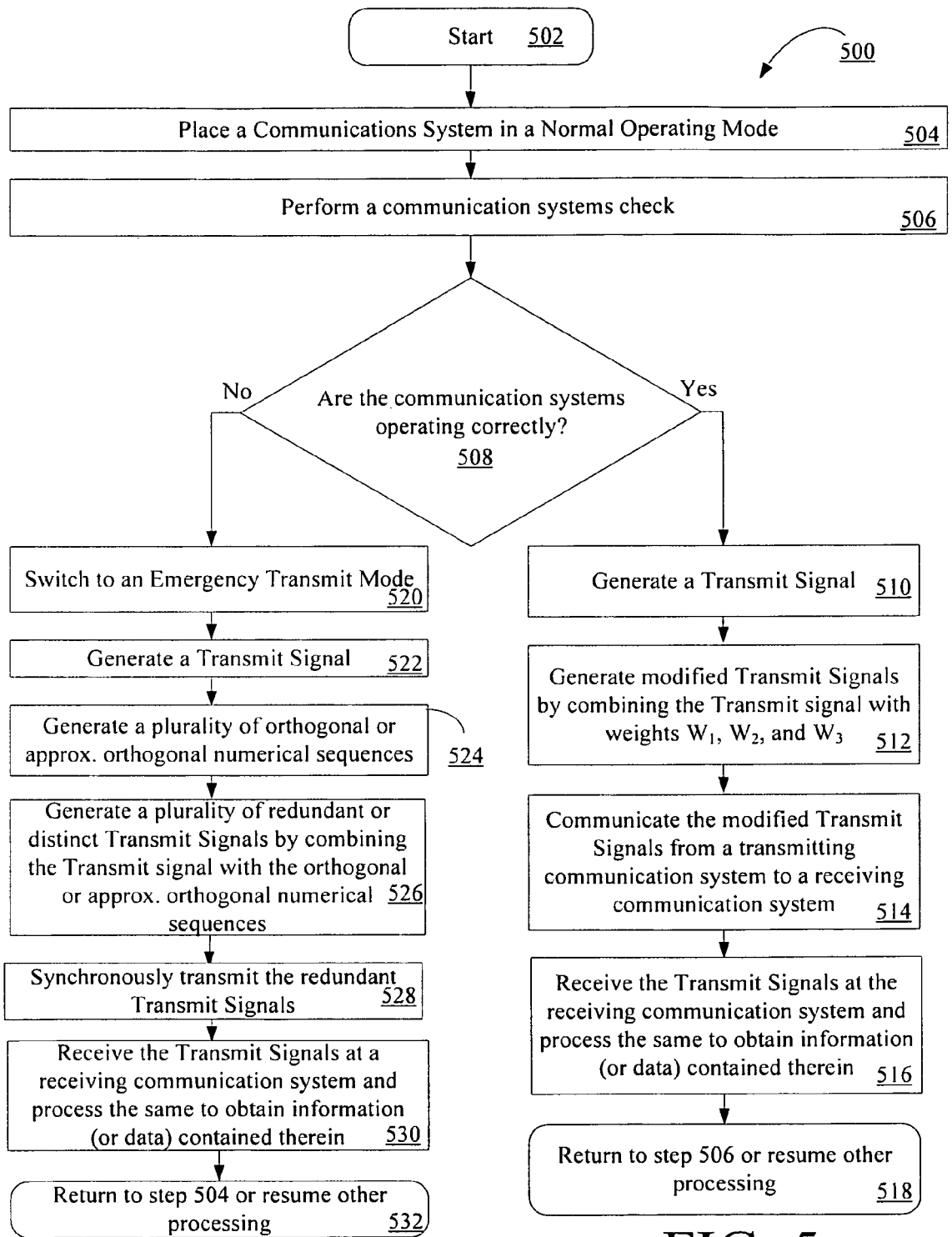
FIG. 5 is a flow diagram of a method for providing a redundant or distinct Code Division Multiple Access (CDMA) transmission feature to a communication system.

Referring now to FIG. 5, there is provided a flow diagram of a method 500 for providing a redundant CDMA transmission feature to a communication system. It should be understood that the method 500 can generally be implemented by the communication system 100 described above. As shown in FIG. 5, the method 500 begins with step 502 and continues with step 504. In step 504, a communication system (e.g., the communication system 100 of FIG. 1) is placed in a normal operating mode. Thereafter, step 506 is performed where a communication systems check is performed. The communication systems check can include, but is not limited to, an array beamforming self test. Array beamforming self tests are well known to those having ordinary skill in the art, and therefore will not be described in detail herein. However, it should be understood that array beamforming self tests generally involve determining if a navigational system of a communication system is operating correctly. The communication systems check can also involve determining if a receiving communication system is operating correctly.

If the communications systems are determined to be operating correctly [508:YES], then the communication systems continue with normal operations. The normal operations are defined by steps 510 through 516. Accordingly, the normal operations involve (510) generating a transmit signal at a transmitting communication system (e.g., the MEAS 150 of FIG. 1), (512) generating modified transmit signals at the transmitting communication system using complex weights $W_1, W_2, W_3$, and (514) communicating the modified transmit signals to a receiving communication system (e.g., the object of interest 108 of FIG. 1). After performing step 514, step 516 is performed where the modified transmit signals are received at the receiving communication system (e.g., the object of interest 108 of FIG. 1). At the receiving communication system, the received signals can generally be processed to obtain the information (or data) contained therein. Subsequently, step 518 is performed where the method 500 returns to step 506 or other processing is resumed.

However, if one or more of the communications systems are determined to be operating incorrectly [508:NO], then step 520 is performed where the communications systems are placed in their emergency operating modes. Step 520 can also involve placing the communication systems in their redundant data modes in which low spreading ratios and high data rates are employed or in their distinct data modes in which high spreading ratios and low data rates are employed. Subsequently, the communication systems continue with emergency operations. The emergency operations are defined by steps 522 through 530. Accordingly, the emergency operations involve (522) generating a transmit signal at the transmitting communication system, (524) generating a plurality of orthogonal or approximately orthogonal numerical sequences at the transmitting communication system, (526) generating a plurality of redundant or distinct transmit signals at the transmitting communication system by combining the transmit signal with the orthogonal or approximately orthogonal numerical sequences, and (528) synchronously transmitting the redundant or distinct transmit signals from the transmitting communication system. In step 530, the transmitted signals are received at the receiving communication system. At the receiving communication system, the received signals can generally be processed to despread the received signals and obtain the information (or data) contained therein. Subsequently, step 532 is performed where the method 500 returns to step 504 or other processing is resumed.

As noted above, the orthogonal or approximately orthogonal numerical sequences facilitate the provision of a redundant or distinct CDMA transmission feature to communication systems. In this regard, it should be understood that the orthogonal or approximately orthogonal numerical sequences can provide redundant or distinct transmit signals including the same information (or data) that are separable, i.e., each of the transmit signals can be recovered at the receiving communication system despite being combined with other transmit signals.

Figure 6:
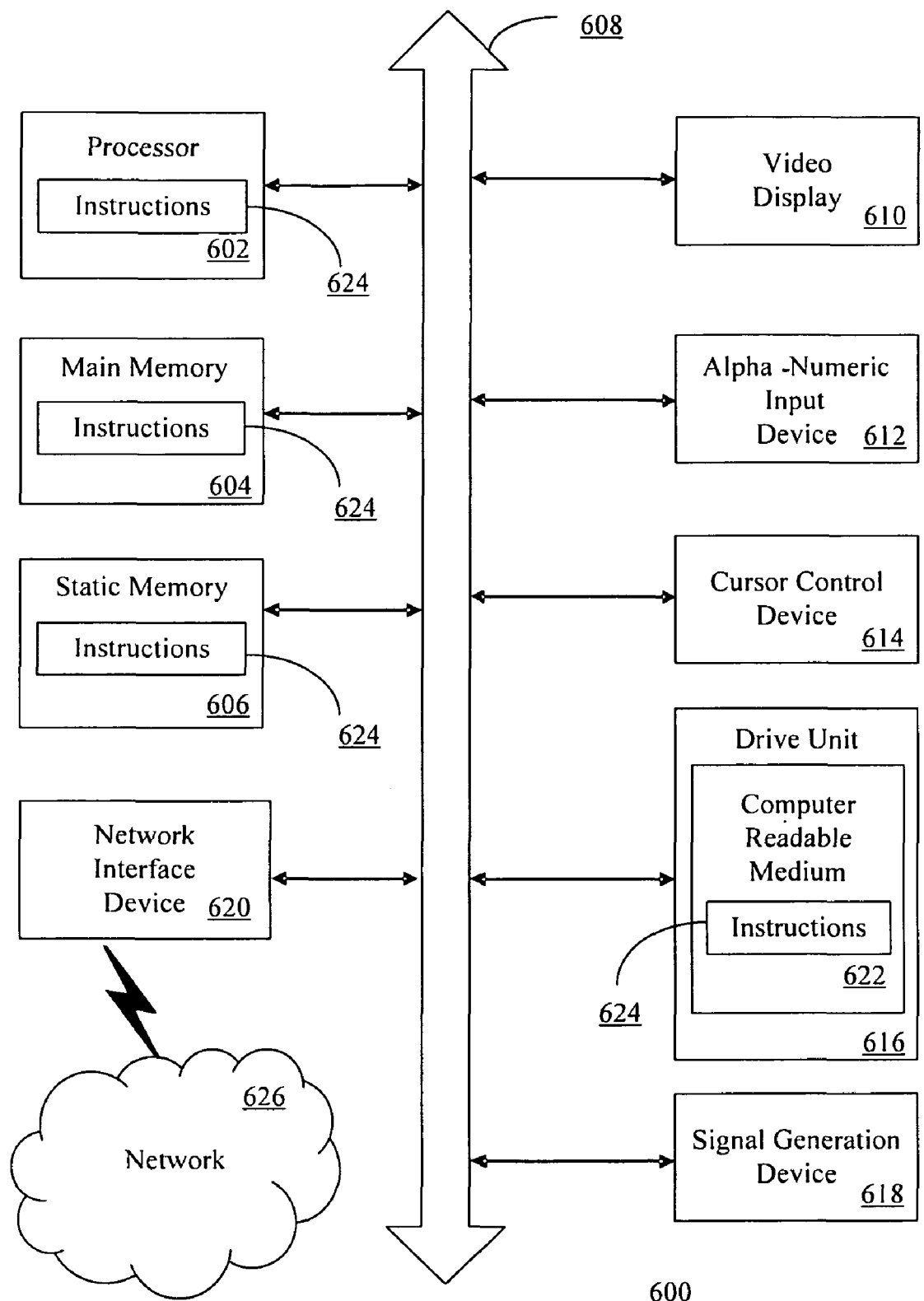
FIG. 6 is a schematic view of a computer system within which a set of instructions operate according to an embodiment of the present invention.

Referring now to FIG. 6, there is provided a schematic diagram of a computer system 600 for executing a set of instructions that can cause the computer system 600 to perform one or more of the methodologies and procedures described above. For example, the computer system 600 can be implemented to perform the various tasks of the transmit side 202 and/or the receive side 204 the ACS 102. In some embodiments, the computer system 600 operates as a single standalone device. In other embodiments, the computer system 600 can be connected (e.g., using a network) to other computing devices to perform various tasks in a distributed fashion. In a networked deployment, the computer system 600 can operate in the capacity of a server or a client developer machine in server-client developer network environment, or as a peer machine in a peer-to-peer (or distributed) network environment.

The computer system 600 can comprise various types of computing systems and devices, including a server computer, a client user computer, a personal computer (PC), a tablet PC, a laptop computer, a desktop computer, a control system, a network router, a switch or a bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 600 can include a processor 602 (such as a central processing unit), a graphics processing unit (GPU, or both), a main memory 604 and a static memory 606. The components 602, 604, 606 communicate with each other via a bus 608. The computer system 600 can also include a display unit 610, such as a video display (e.g., a liquid crystal display or LCD), a flat panel, a solid state display, or a cathode ray tube (CRT)). The computer system 600 can further include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 can include a computer-readable storage medium 622 on which is stored one or more sets of instructions 624 (e.g., software code) configured to implement one or more of the methodologies, procedures, or functions described herein. The instructions 624 can also reside, completely or at least partially, within the main memory 604, the static memory 606, and/or within the processor 602 during execution thereof by the computer system 600. The main memory 604 and the processor 602 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 624 or that receives and executes instructions 624 from a propagated signal so that a device connected to a network environment 626 can send or receive voice and/or video data, and that can communicate over the network 626 using the instructions 624. The instructions 624 can further be transmitted or received over a network 626 via the network interface device 620.

While the computer-readable storage medium 622 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; as well as carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

In light of the forgoing description of the present invention, it should be recognized that embodiments of the present invention can be realized in hardware, software, or a combination of hardware and software. A method for providing a redundant CDMA transmission feature to selected antenna elements according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Applicants present certain theoretical aspects above that are believed to be accurate that appear to explain observations made regarding embodiments of the invention. However, embodiments of the present invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the present invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A method for providing a redundant or distinct transmission feature to a communication system, comprising:
   detecting at the communication system if there is a communication systems fault resulting from an operational failure occurring in equipment thereof which prevents a beam produced by an antenna array of said communication system from being properly formed or pointed;
   if the communication systems fault is not detected, generating by a transmit system of said communication system a plurality of modified transmit signals by combining a transmit signal with a plurality of complex weights and transmitting the plurality of modified transmit signals from a plurality of antenna elements of said antenna array of the transmit system to an object of interest; and
   if the communication systems fault is detected, generating by said transmit system a plurality of redundant or distinct transmit signals by combining the transmit signal with a plurality of first orthogonal or approximately orthogonal numerical sequences and synchronously transmitting the plurality of redundant or distinct transmit signals from the plurality of antenna elements.

2. The method according to claim 1, further comprising generating the plurality of first orthogonal numerical sequences using a plurality of orthogonal Walsh Functions.

3. The method according to claim 1, wherein the plurality of first approximately orthogonal numerical sequences are random or pseudo-random number sequences.

4. The method according to claim 1, wherein the plurality of first approximately orthogonal numerical sequences are chaotic sequences.

5. The method according to claim 1, wherein the operational failure is associated with a navigation system.

6. The method according to claim 1, wherein the communication systems fault is a result of an operational failure occurring at the object of interest.

7. The method according to claim 1, further comprising receiving the plurality of modified transmit signals at the object of interest and processing the plurality of modified transmit signals to recover information contained therein.

8. The method according to claim 1, further comprising receiving the plurality of redundant or distinct transmit signals at the object of interest and processing the plurality of redundant or distinct transmit signals to recover information contained therein.

9. A method for providing a redundant or distinct transmission feature to a communication system, comprising:
   detecting at the communication system if there is a communication systems fault resulting from an operational failure occurring in equipment thereof which prevents a beam produced by an antenna array of said communication system from being properly formed or pointed;

if the communication systems fault is not detected, generating by a transmit system of said communication system a plurality of modified transmit signals by combining a transmit signal with a plurality of complex weights and transmitting the plurality of modified transmit signals from a plurality of antenna elements of said antenna array of the transmit system to an object of interest; and if the communication systems fault is detected, generating by said transmit system a plurality of redundant or distinct transmit signals by combining the transmit signal with a plurality of first orthogonal or approximately orthogonal numerical sequences and synchronously transmitting the plurality of redundant or distinct transmit signals from the plurality of antenna elements;

receiving the plurality of redundant or distinct transmit signals at the object of interest and processing the plurality of redundant or distinct transmit signals to recover information contained therein; and generating a plurality of second orthogonal or approximately orthogonal numerical sequences at the object of interest and using the plurality of second orthogonal or approximately orthogonal numerical sequences to despread the plurality of redundant or distinct transmit signals, wherein the plurality of second orthogonal or approximately orthogonal numerical sequences are the same as the plurality of first orthogonal or approximately orthogonal numerical sequences.

10. A method for providing a redundant or distinct transmission feature to a communication system, comprising:

detecting at the communication system if there is a communication systems fault resulting from an operational failure occurring in equipment thereof which prevents a beam produced by an antenna array of said communication system from being properly formed or pointed;

if the communication systems fault is not detected, generating by a transmit system of said communication system a plurality of modified transmit signals by combining a transmit signal with a plurality of complex weights and transmitting the plurality of modified transmit signals from a plurality of antenna elements of said antenna array of the transmit system to an object of interest; and if the communication systems fault is detected, placing the communication system in redundant data modes in which low spreading ratios and high data rates are employed or in distinct data modes in which high spreading ratios and low data rates are employed, and generating by said transmit system a plurality of redundant or distinct transmit signals by combining the transmit signal with a plurality of first orthogonal or approximately orthogonal numerical sequences and synchronously transmitting the plurality of redundant or distinct transmit signals from the plurality of antenna elements.

11. A communication system, comprising:

a detection device for detecting if there is a communication system fault resulting from an operational failure occurring in equipment thereof which prevents a beam produced by an antenna array of said communication system from being properly formed or pointed;

a plurality of beamformers for generating a plurality of modified transmit signals by combining a transmit signal with a plurality of complex weights if the communication system fault is not detected; and a plurality of combiners for generating a plurality of redundant or distinct transmit signals by combining the transmit signal with a plurality of first orthogonal or approximately orthogonal numerical sequences if the communication system fault is detected; and a plurality of antenna elements for transmitting the plurality of modified transmit signals to an object of interest and synchronously transmitting the plurality of redundant or distinct transmit signals therefrom.

12. The communication system according to claim 11, further comprising at least one orthogonal sequence generator for generating the plurality of first orthogonal numerical sequences using a plurality of orthogonal Walsh Functions.

13. The communication system according to claim 11, wherein the plurality of first orthogonal or approximately orthogonal numerical sequences are random number sequences, pseudo-random number sequences, or chaotic sequences.

14. The communication system according to claim 11, wherein the operational failure is associated with a navigation system.

15. The communication system according to claim 11, wherein the communication systems fault is a result of an operational failure occurring at the object of interest.

16. The communication system according to claim 11, wherein the object of interest is configured for receiving the plurality of modified transmit signals and processing the plurality of modified transmit signals to recover information contained therein.

17. The communication system according to claim 11, wherein the object of interest is configured for receiving the plurality of redundant or distinct transmit signals and processing the plurality of redundant or distinct transmit signals to recover information contained therein.

18. A communication system, comprising:

a detection device for detecting if there is a communication system fault resulting from an operational failure occurring in equipment thereof which prevents a beam produced by an antenna array of said communication system from being properly formed or pointed;

a plurality of beamformers for generating a plurality of modified transmit signals by combining a transmit signal with a plurality of complex weights if the communication system fault is not detected; and a plurality of combiners for generating a plurality of redundant or distinct transmit signals by combining the transmit signal with a plurality of first orthogonal or approximately orthogonal numerical sequences if the communication system fault is detected; and a plurality of antenna elements for transmitting the plurality of modified transmit signals to an object of interest and synchronously transmitting the plurality of redundant or distinct transmit signals therefrom;

wherein the object of interest is configured for receiving the plurality of redundant or distinct transmit signals and processing the plurality of redundant or distinct transmit signals to recover information contained therein;

wherein the object of interest is further configured for generating a plurality of second orthogonal or approximately orthogonal numerical sequences and using the plurality of second orthogonal or approximately orthogonal numerical sequences to despread the plurality of redundant or distinct transmit signals, wherein the plurality of second orthogonal or approximately orthogonal numerical sequences are the same as the plurality of first orthogonal or approximately orthogonal numerical sequences.

* * * * *